United States Patent [19]

Ward

[11] Patent Number: 4,687,086

[45] Date of Patent: Aug. 18, 1987

[54] TORSIONAL VIBRATION DAMPERS

[75] Inventor: Christopher G. Ward, Leamington Spa, England

[73] Assignee: Automotive Products plc, Warwickshire, England

[21] Appl. No.: 861,443

[22] Filed: May 9, 1986

[30] Foreign Application Priority Data

May 10, 1985 [GB] United Kingdom ................. 8511914

[51] Int. Cl.$^4$ ................................................. F16D 3/66
[52] U.S. Cl. ............................. 192/106.2; 192/70.17; 192/106.1; 464/68
[58] Field of Search ............... 192/70.17, 70.18, 106.1, 192/106.2; 464/62, 64, 66, 81

[56] References Cited

U.S. PATENT DOCUMENTS

| | | | |
|---|---|---|---|
| 4,044,874 | 8/1977 | Wörner | 192/106.2 |
| 4,354,586 | 10/1982 | Stanley | 192/106.2 |
| 4,496,036 | 1/1985 | Loizeau | 192/106.2 |
| 4,548,310 | 10/1985 | Maucher | 192/106.2 |
| 4,577,743 | 3/1986 | Raab et al. | 192/106.2 |
| 4,592,460 | 6/1986 | Kittel | 192/106.2 |
| 4,613,030 | 9/1986 | Maycock et al. | 192/106.2 |

FOREIGN PATENT DOCUMENTS 2052683B 1/1983 United Kingdom .

Primary Examiner—John E. Murtagh
Assistant Examiner—Andrew Joseph Rudy
Attorney, Agent, or Firm—Solon B. Kemon

[57] ABSTRACT

A torsional vibration damper primarily for use in a friction clutch driven plate has a hub with a radial flange. An outer member includes two generally annular side plates, one each side of the flange joined by stop pin rivets and mounted for limited relative angular movement with respect to the hub. Compression springs act between the hub and the outer member in mutually aligned circumferentially directed apertures in the flange and side plates to control the relative rotation. A generally annular control plate is mounted for angular movement with respect to the hub and the outer member and has tabs which engage a side plate to limit relative rotation between the control plate and the hub to less than the relative rotation available between the hub and the outer member. A frictional interconnection between the control member and the outer member comprises spring clip members engaging around the control plate and one of the side plates to hold the control plate and outer member in frictional engagement with each other.

9 Claims, 6 Drawing Figures

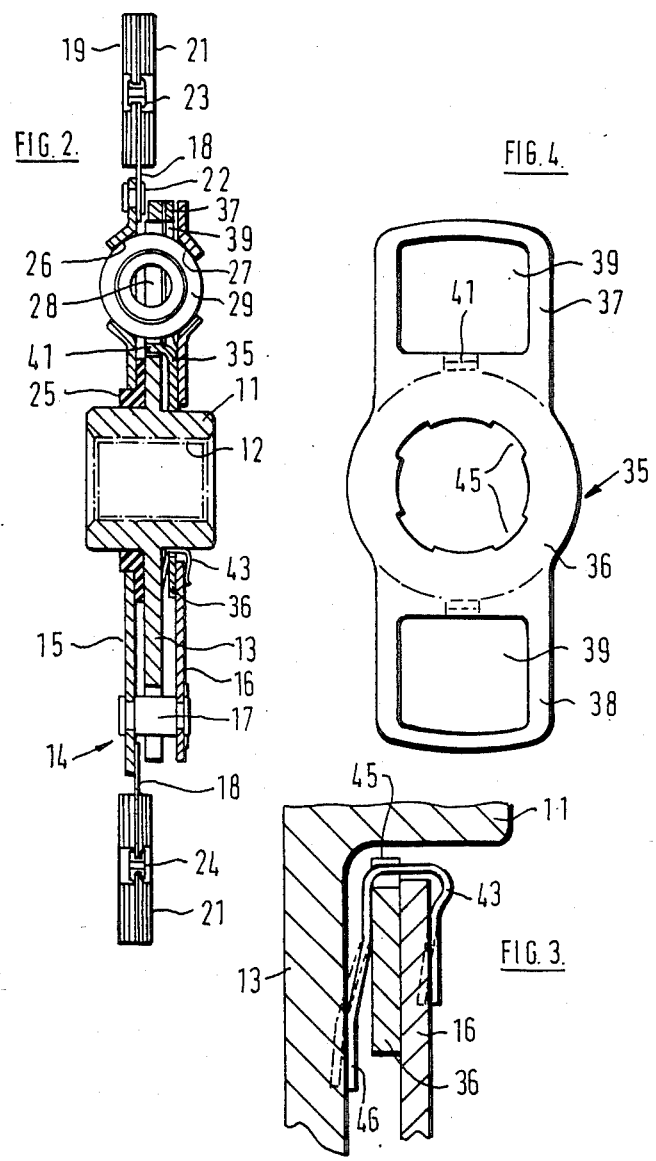

TORSIONAL VIBRATION DAMPERS

BACKGROUND OF THE INVENTION

The invention relates to torsional vibration dampers particularly but not exclusively for incorporation in automobile friction clutch driven plates.

Friction clutch driven plates for motor vehicles typically comprise a friction facing carrier mounted on and capable of limited angular movement about a flanged hub, resilient means acting between the carrier and the hub flange to control the angular movement and friction damping means acting between the hub and the carrier. It is also known to provide a control means mounted for angular movement with respect to the hub and carrier and stops means limiting angular movement between the control member and one of the hub and carrier to less than the angular movement available between the hub and the carrier. A frictional interconnection between the control member and the other of the hub and carrier then comes into effect to provide frictional resistance to angular movement between the hub and the carrier after initial relative movement during which the control member moves more freely within limits controlled by the stop means.

One such construction is shown in our own Patent GB No. 2 052 683 B.

It is an object of the present invention to provide a torsional vibration damper providing controlled friction in this way but with a simplified construction.

SUMMARY OF THE INVENTION

In accordance with the present invention there is provided a torsional vibration damper having a hub, an outer member mounted for limited relative angular movement with respect to the hub, resilient means acting between the hub and the outer member to control the angular movement, a control member mounted for angular movement with respect to the hub and outer member, stop means limiting angular movement between the control member and one of the hub and outer member to limit angular movement therebetween to less than the angular movement available between the hub and the outer member and a frictional interconnection between the control member and the other of the hub and outer member comprising at least one spring clip member engaging around mutually adjacent like portions of the control member and said other of the hub and outer member to hold the plate like portions in frictional engagement with each other.

Preferably the control member is also acted on by resilient means tending to urge it to a predetermined position in relation to the stop means. The later resilient means may form part of the resilient means acting between the hub and outer member.

In accordance with a second aspect of the invention there is provided a torsional vibration damper having a hub with a radial flange, an outer member including two generally annular side plates, one to each side of the flange, mounted for limited relative angular movement with respect to the hub, resilient means acting between the hub and the outer member in mutually aligned circumferentially directed apertures in the flange and side plates to control the angular movement, a generally angular control plate mounted for angular movement with respect to the hub and the outer member, stop means limiting angular movement between the control plate and the hub to limit angular movement therebetween to less than the angular movement available between the hub and the outer member and a frictional interconnection between the control member and outer member comprising a least one spring clip member engaging around the control plate and one of the side plates to hold the control plate and outer member in frictional engagement with each other.

The spring clip members may be arranged symmetrically around the damper. The spring clip members may engage around the control plate and side plate within central apertures in these plates. The clip members may be arranged in recesses in these central apertures.

The spring clip members may also bear on the flange of the hub to provide axial loading between the other side plate and the hub to generate controlled friction therebetween. The invention extends to a friction clutch driven plate incorporating a torsional vibration damper according to the invention.

BRIEF DESCRIPTION OF THE DRAWINGS

An embodiment of the invention will now be described with reference to the accompanying drawings in which:

FIG. 2 is a section on the line II—II of FIG. 1;

FIG. 3 is an enlarged view of a spring clip member employed in the driven plate;

FIG. 4 is an end elevation of a control member forming part of the driven plate.

DESCRIPTION OF A PREFERRED EMBODIMENT

Figure 1:
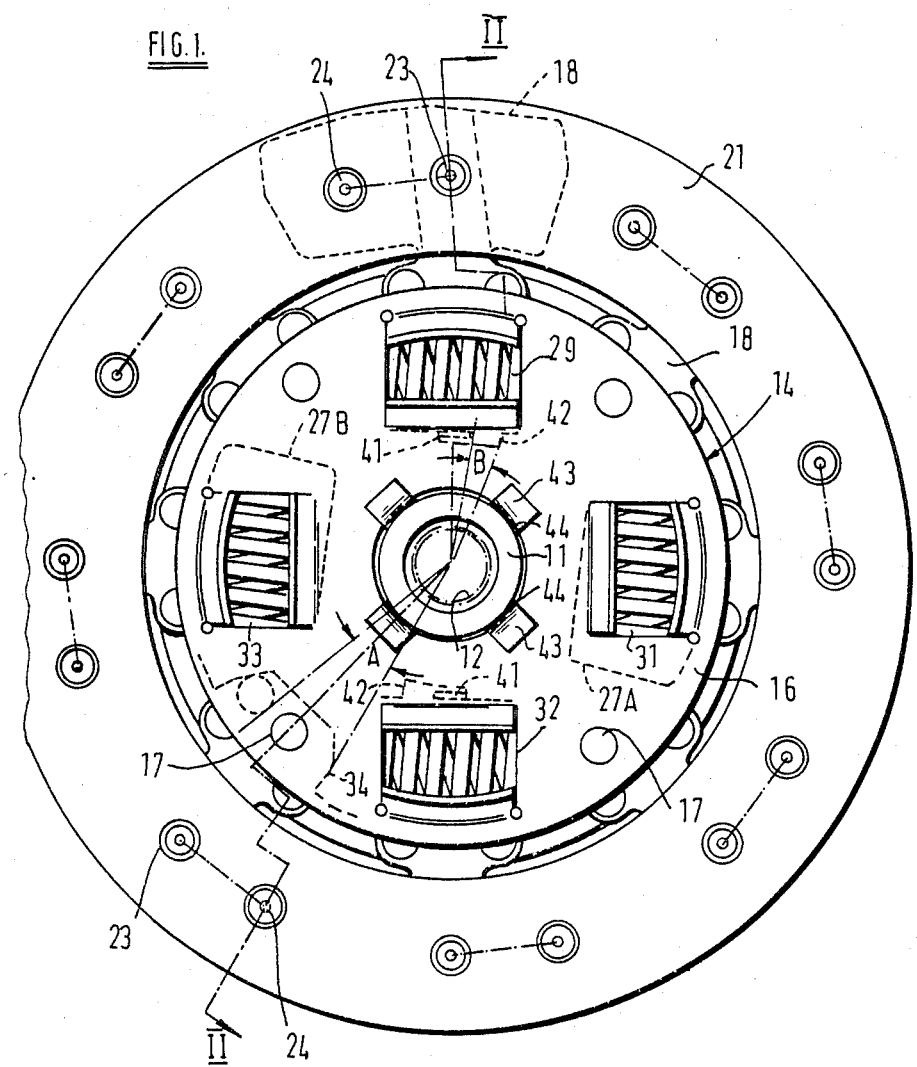
FIG. 1 is an end elevation of a friction clutch driven plate and of the parts with which it co-operates.

A friction clutch driven plate incorporating a torsional vibration damper comprises a hub 11 having a splined central opening 12 for engagement on a shaft to be driven by the driven plate, typically the input shaft to a gear box. The hub also incorporates a radial flange 13. An outer member forming a friction facing carrier 14 is constituted primarily by two annular side plates 15 and 16 arranged one to each side of the flange 13 and joined together by shouldered rivets 17 normally referred to as stop pins as will be described subsequently. Around its outer periphery, the side plate 15 carries a series of spring steel segments 18 which in turn carry friction facings 19 and 21. Rivets 22 secure the segments to the side plate, rivets 23 secure the friction facing 19 to the segments and rivets 24 secure the facing 21 to the segments.

Side plate 15 has a circular central aperture by means of which the carrier is centered on the hub 11 through the intermediary of a shouldered friction washer 25 which also extends between the hub 13 and the side plate to provide controlled friction for angular movement between the hub and the facing carrier in a manner to be described. Side plate 16 also incorporates a generally circular central aperture which surrounds the hub with a small clearance.

Both side plates 15 and 16 and the hub flange 13 have generally mutually aligned circumferential extending apertures or windows 26, 27 and 28 (see FIG. 2) equally spaced at four locations around the circumference. These apertures carry circumferentially directed coil springs 29, 31, 32 and 33 which bear against the ends of the windows and are compressed by relative angular movement between the hub 11 and carrier 14. In this example, these are double springs, that is one spring inside another as shown for spring 29 in FIG. 2. Also, the windows 27A and 27B in hub flange 13 for springs 31 and 32 extend in a clockwise direction as shown beyond the corresponding side plate windows 27 so that in one direction of angular movement springs 31 and 33 are ineffective until this clearance has been taken up. The stop pins 17 referred to earlier pass through notches 34 in the outer periphery of the flange. Relative angular movement between the hub and the carrier is limited by the stop pins 17 coming into engagement with ends of the notches 34.

The driven plate also incorporates a control member or control plate 35 which is positioned between side plate 16 and flange 13. The control plate is shown in greater detail in FIG. 4.

The control plate incorporates a generally annular inner plate like portion 36 for location on the hub 11 and two outward extensions 37 and 38 each incorporating an aperture 39 for engagement with the springs 29 and 32. At the inner edge of each window 39, the control plate incorporates bent-over tabs 41 which engage in inward extensions 42 of windows 28 carrying springs 29 and 32. Tabs 41 and extensions 42 cooperate to form stop means which limit the angular movement between the control plate 35 and the hub 11 to less than the movement available between the hub and carrier, this latter movement being controlled by stop pins 17 in notches 34. In this example the inward extensions 42 are offset as shown so that as shown in FIG. 1 the control plate 35 can only move clockwise relative to the hub 11.

Control plate 35 is held in frictional contact with side plate 16 by a series of four spring clip members 43. The spring clip members engage around the control plate and side plate as best seen in FIG. 3, passing through the central apertures in these plates. The clearance between the side plate and the hub is sufficient to avoid interference by these spring clip members. Recesses 45 are provided in the central aperture in the control plate and the length of each recess corresponds to the width of the clip 43 and thus helps to locate the clip. As best seen in FIG. 3, each spring clip member is generally U-shaped and is formed as a pressing from spring steel strip. Each clip has an extension 46 which in use bears against a side of the hub flange 13 as shown in FIG. 3. The spring clip member holds the control plate and side plate in frictional engagement with each other so that any relative circumferential movement is subject to a frictional force. The extension 46 in bearing against flange 13 urges the friction facing carrier 14 to the right relative to the hub 11 as shown in FIG. 2 and thus provides an axial load between side plate 15 and flange 13 through the friction washer 25. The spring forces and materials used are such that the friction force associated with relative movement between the hub and the carrier is very much less than that between the carrier and the control plate.

In use, when torque is applied through the friction facings for transmission through the carrier to the hub in an overdrive direction, that is clockwise for the carrier in FIG. 1, this torque is transmitted through the springs 29 and 32 only and results in relative movement between the carrier and hub. The clearance of windows 27A and 27B renders springs 31 and 33 ineffective. During this movement, the control plate moves with the carrier by virtue of the clearance between tabs 41 and window extensions 42. The result is low friction during this initial overdrive movement associated with the friction washer 25. Once the clearance between tabs 41 and window extensions 42 has been taken up, further movement between the hub and carrier is accompanied by relative movement against a greater frictional load between the carrier and the control plate. At approximately the same angular movement as the higher friction becomes operative, the clearance of springs 31 and 33 in windows 27A and 27B is taken up to render these springs effective and increase the resilient resistance to further relative movement. By this means, initial movement between the hub and carrier from a central position in the overdrive direction is accompanied by low friction and a low spring force whereas subsequent movement is accompanied by higher friction and higher spring force. This situation arises only in the overdrive direction of relative movement. The engagement of the intermediate plate through its windows 39 with springs 29 and 32 causes the intermediate plate to be returned to a central position as shown on each occasion when load is released from the driven plate. As load is released the components deflect back to the position shown under the influence of the springs.

In the drive direction, that is anticlockwise for the carrier in FIG. 1, the absence of effective clearance in extensions 42 for tabs 41 results in an immediate application of the higher friction associated with the movement between the carrier and the control plate, the control plate being held by tabs 41 against movement with respect to the hub. Similarly all four double springs become effective immediately to give a high spring rate. Again, as load is released the components are returned to the position shown under the influence of the springs.

Although the control plate and its adjacent side plate have been shown in direct contact with each other, it would be possible in an alternative construction to interpose a friction washer between these two plates.

In a further alternative, the clearance of the springs 31 and 33 in windows 27A and 27B is such that the springs never come into operation in the overdrive direction.

Figures 5, 6:
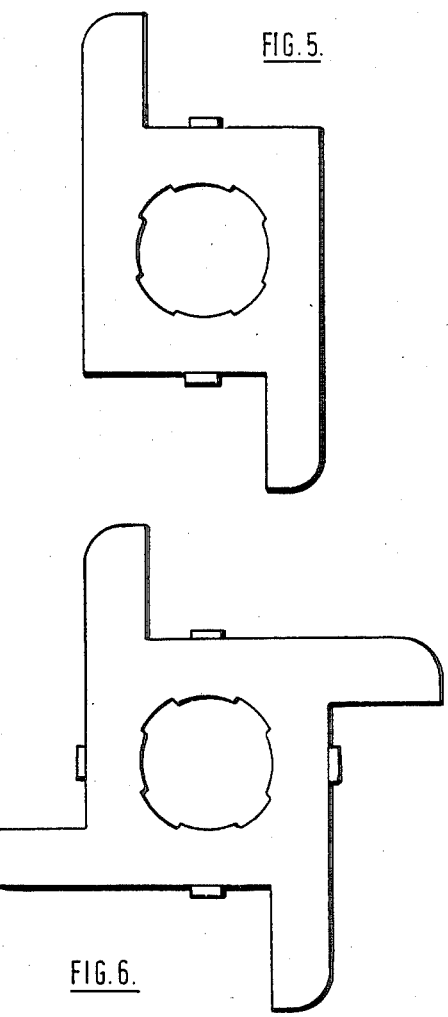
FIGS. 5 and 6 show alternative designs of the intermediate member.

FIGS. 5 and 6 show alternative designs for the control plate. In FIG. 5, those parts of the outward extension which do not engage against springs 31 and 33 have been removed. One effect is to leave the tabs 41 projecting beyond the adjacent part of the control plate. Also the annular inner portion has been replaced by a portion of square section. In FIG. 6, the control plate has four extensions for co-operation with all four double springs 29, 31, 32 and 33.

I claim:
1. A torsional vibration damper comprising:
   a first member in the form of a hub;
   a second member having a plate-like portion mounted for limited relative angular movement with respect to said first member;
   resilient means acting between said first and second members to control the angular movement;
   a control member having a plate-like portion positioned adjacent to the plate-like portion of said second member, said control member being mounted for angular movement with respect to said first and second members;
   stop means limiting angular movement between said control member and one of said first and second members to limit angular movement between said control member and said one of said first and sec- ond members to less than the angular movement between said first and second members; and at least one spring clip engaging around adjacent portions of the plate-like portion of said control member and another of said first and second members to hold said plate-like portion in frictional engagement with said another of said first and second members.

2. A torsional vibration damper according to claim 1 and including resilient means acting on said control member and urging it to a predetermined position in relation to said stop means.

3. A torsional vibration damper according to claim 2, wherein said resilient means acting on said control member forms part of said resilient means acting between said first and second members.

4. A torsional vibration damper comprising:

a hub incorporating a radial flange;

an outer member including two generally annular side plates mounted for limited relative angular movement with respect to said hub, said side plates being disposed on opposite side of said radial flange;

mutually aligned circumferentially directed apertures in said flange and side plates;

resilient means arranged in said apertures and acting between said hub and outer member to control angular movement therebetween;

a generally annular control plate mounted for angular movement with respect to said hub and outer member;

stop means limiting angular movement between said control plate and hub to limit angular movement therebetween to less than the angular movement available between said hub and outer member; and at least one spring clip engaging around said control plate and one of said side plates to hold said control plate and outer member in frictional engagement with each other.

5. A torsional vibration damper according to claim 4 and including a plurality of spring clips spaced around the damper.

6. A torsional vibration damper according to claim 5, wherein said control plate and said one of said side plates incorporate central apertures, and wherein said plurality of spring clips engage around said control and side plates within said central apertures.

7. A torsional vibration damper according to claim 6 and including recesses provided in one of said central apertures, and wherein the spring clips are arranged within said recesses.

8. A torsional vibration damper according to claim 5, wherein said spring clips additionally bear on the radial flange of said hub to provide axial loading between the other of said side plates and hub to generate controlled friction therebetween.

9. A friction clutch driven plate incorporating a torsional vibration damper according to claim 1.

* * * * *